United States Patent Office 3,505,404
Patented Apr. 7, 1970

3,505,404
3,3-DIALKYL-1-PHENYL-1-INDANALKYLAMINES
Povl Viggo Petersen, Virum, Villy Halfdan Hansen, Copenhagen, and Jes Hjortkjer, Hvidovre, Denmark, assignors to Kefalas A/S, Copenhagen-Valby, Denmark
No Drawing. Filed Sept. 19, 1966, Ser. No. 580,206
Claims priority, application Great Britain, Oct. 1, 1965, 41,849/65
Int. Cl. C07c *87/28, 121/60;* C07k *27/00*
U.S. Cl. 260—570.8     11 Claims

ABSTRACT OF THE DISCLOSURE

Compounds represented by the formula:

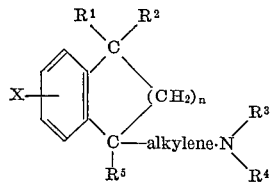

wherein $R^1$ and $R^2$ each is a lower alkyl-group, $n$ is selected from 1 and 2, "alkylene" is an alkylene chain containing from two to eight carbon atoms, at least two and at the highest four carbon atoms being in the chain directly connecting the ring system with the nitrogen atom,

is selected from the class consisting of mono-lower-alkylamino, and di-lower-alkylamino, $R^5$ is selected from the group consisting of phenyl, and phenyl substituted with a substituent selected from the group consisting of chlorine, fluorine, lower-alkyl, lower-alkyloxy and trifluoromethyl, and X is selected from the group consisting of hydrogen, chlorine, fluorine, lower-alkyl, lower-alkyloxy and trifluoromethyl, and (b) nontoxic acid addition salts thereof with pharmaceutically acceptable acids; useful as antidepressants.

---

The present invention relates to compounds of the following general formula:

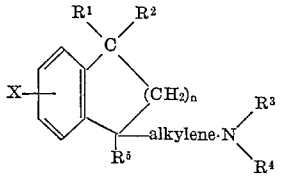

wherein $R^1$ and $R^2$ each represents hydrogen or a lower-alkyl group, $n$ is 1 or 2, "alkylene" represents an alkylene chain branched or unbranched containing from two to eight carbon atoms at least two and at the highest four carbon atoms being in the chain directly connecting the ring system with the nitrogen atom, $R^3$ and $R^4$ each represents hydrogen, or a lower-alkyl group, provided that $R^3$ and $R^4$ may not both represent hydrogen, or $R^3$ and $R^4$ taken together with the nitrogen atom represent the radical of a heterocyclic amine having a saturated five-membered or six-membered ring, $R^5$ represents a phenyl group, possibly substituted with a halogen atom, a lower-alkyl group, a lower-alkyloxy group or a trihalomethyl group, —CN, —COOH, —CO·NH$_2$, —COOR$^6$, —CO·R$^7$ or CHOR·R$^7$, wherein $R^6$ represents a lower-alkyl group, and $R^7$ is phenyl or lower-alkyl, and X represents hydrogen, halogen, a lower-alkyl group, a lower-alkyloxy group or a trihalomethyl group, as well as non-toxic acid addition salts thereof.

It is an object of the present invention to provide compounds of Formula I, methods of making the same, a method for the alleviation, palliation, mitigation, or inhibition of the manifestations of certain physiological-psychological abnormalies of animals therewith, and pharmaceutical compositions comprising such compounds as active ingredient. Other objects will be apparent to one skilled in the art and still other objects will become apparent hereinafter.

Some of the compounds of Formula I are known from U.S. Patent No. 2,798,888 and described as useful as medicaments, more particularly as spasmolytics and vasodilators. However, so far none of the compounds described in said U.S. patent have been brought on the market as drugs, and it was quite surprising therefore when according to the present invention it was found that some of the compounds showed excellent pharmacodynamic properties which make them useful in treatment within the psychotherapy especially of endogenic depressions.

In animal experiments the compounds of Formula I and the acid addition salts thereof show a very pronounced potentiating effect on adrenaline and nor-adrenaline and also a very strong anti-reserpine effect. They moreover have relatively weak sedative and anti-cholinergic effects. The acute toxicity is relatively low.

The compounds of Formula I wherein $R^1$ and $R^2$ both represent low-alkyl groups are hitherto unknown and constitute part of the present invention. They showed particularly outstanding pharmacodynamic properties in the aforesaid animal experiments which make them particularly suitable within the psychotherapy.

The compounds of Formula I and the non-toxic acid addition salts thereof may be administered both orally and parenterally, for example in the form of tablets, capsules, powders, syrups or solutions for injection.

The invention moreover relates to a method for the preparation of compounds of Formula I, whereby a compound of the following formula:

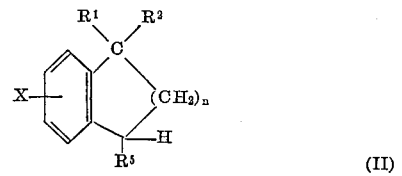

wherein $R^1$, $R^2$, $n$ and X are as defined above, and $R^5$ represents —CN or a phenyl group, possibly substituted with a halogen atom, a lower-alkyl group, a lower-alkyloxy group or a trihalomethyl groups, is reacted with a compound of the following formula:

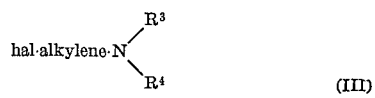

wherein "alkylene," $R^3$ and $R^4$ are as defined above and "hal" represents a halogen atom, in the presence of an alkalimetal hydride or potassium amide in dimethylsulphoxide or liquid ammonia, and isolating the compound of Formula I as the free amine or as a non-toxic acid addition salt in conventional manner, and in the case when $R^3$ and $R^4$ each represents a lower-alkyl group, if desired, reacting the compound of Formula I with a chloroformic acid ester of the formula Cl·COOR$^6$, wherein $R^6$ represents a lower-alkyl group or a benzyl group, hydrolysing the resulting compound of the formula:

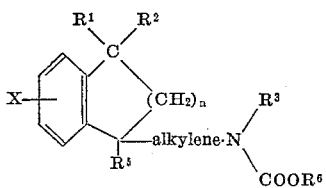

and isolating the compound of Formula I, wherein $R^3$ is a lower-alkyl group and $R^4$ is hydrogen as the free amine or in the form of a non-toxic addition salt, and if $R^5$ in the compound of Formula II is —CN, if desired, reacting the cyano-compound with (a) a Grignard compound selected from phenylmagnesium halides and lower-alkylmagnesiumhalides and subsequently hydrolysing the thus formed Grignard complex in conventional manner in order to obtain compounds of Formula I wherein $R^5$ is —CO·$R^7$ and, if desired, reducing the —CO·$R^7$ group to —CHOH·$R^7$ in conventional manner, or (b) converting the —CN group to either —COOH or —CO·NH$_2$ in well-known manner and, if desired, esterifying the —COOH group in conventional manner in order to obtain compounds of Formula I wherein $R^5$ is —COOR$^6$, and isolating the thus obtained compounds of Formula I as the free amine or as a non-toxic acid addition salt with a pharmaceutically acceptable acid.

When using an alkalimetal hydride as a condensing agent sodium hydride is preferably used and the temperature of the reaction is advantageously kept within about room temperature and about 200 degrees centigrade.

The reaction taking place in the presence of a alkalimetal hydride as a condensing agent is preferably carried out in dimethylsulfoxide as an inert solvent. In the case where potassium amide is used as the condensing agent it is sometimes convenient to carry out the reaction in liquid ammonia. Also mixtures of these solvents may be used.

The acid addition salts of the novel compounds of Formula I are preferably salts of pharmacologically acceptable non-toxic acids such as mineral acids, for example, hydrochloric acid, hydrobromic acid, phosphoric acid, sulphuric acid, and the like, and organic acids such as acetic acid, tartaric acid, maleic acid, citric acid, methane sulphonic acid, and the like.

In the foregoing Formula I and elsewhere herein, the terms lower-alkyl and lower-alkyloxy refer to alkyl or alkyloxy radicals containing up to and including eight carbon atoms, and preferably no more than three carbon atoms, which radicals may have either straight or branched-chain structure, for example methyl, ethyl, propyl, isopropyl, butyl, isobutyl, amyl, hexyl, heptyl, octyl, methoxy, ethoxy, propoxy, butoxy, amyloxy, hexoxy, heptoxy, or the like.

As representative examples of radicals in which $R^3$ and $R^4$ together with the nitrogen atom in Formula I represent the radical of a heterocyclic amine having a saturated five-membered or six-membered ring may be mentioned the pyrrolidine, piperidine, morpholine, thiamopholine, N'-lower-alkyl-piperazine, e.g. N'-methylpiperazine, N'-hydroxy-lower-alkyl-piperazine, e.g. N'-(β-hydroxyethyl)-piperazine, piperazine, or such radicals containing from one to four or even more C-loweralkyl, e.g. C-methyl, substituents, e.g. tetramethylpyrrolidine, and like radicals.

The starting compounds of Formula II are preferably such compounds wherein X is hydrogen, $R^1$ and $R^2$ are most preferably methyl groups, $n$ is 1, and $R^5$ is a phenyl group, and the aminoalkylhalides of Formula III are advantageously such compounds wherein $R^3$ and $R^4$ are hydrogen or methyl groups, and "alkylene" is a propylene chain not only from the standpoint of pharmacological importance and availability of these starting materials, but also from the standpoint of ease of operation and smoothness of reaction.

The following examples are given by way of illustration only and are not to be construed as limiting.

EXAMPLE 1

1-(3'-dimethylaminopropyl)-1-phenylindane and its hydrochloride 20 grams of a sodiumhydride/mineral oil-suspension (50% sodium hydride by weight) were suspended in 250 milliliters of dimethylsulphoxide with stirring at room temperature, consecutively, 65 grams of 1-phenylindane and 50 grams of freshly distilled 3-dimethylaminopropylchloride were added and the mixture was heated cautiously on a steambath in nitrogen-atmosphere until the temperature reached about 60–70 degrees centigrade when a vigorous exothermic reaction started. The temperature of the mixture rose to about 150 degrees centigrade. After the spontaneous reaction had subsided, heating was continued under reflux for a further hour with stirring. The excess of sodium hydride was removed by addition of the hydrochloride of dimethylaminopropylchloride until the red colour of the mixture was replaced by a yellow to green colour. Thereupon were added a few milliliters of methanol and one liter of water. The mixture was extracted with ether and the ether phase isolated, whereupon the ether phase was extracted with 4 n hydrochloric acid. The hydrochloride of 1-(3'-dimethylaminopropyl)-1-phenylindane crystallized in the aqueous phase and was filtered off. After drying in vacuo-desiccator and recrystallization from a mixture of ethanol-ether it melted at 165–167 degrees centigrade. Yield 50 grams.

EXAMPLE 2

14 grams of the hydrochloride of 1-(3'-dimethylaminopropyl)-1-phenylindane were converted to the free base by dissolving in water, adding sodium hydroxide and extracting the liberated base with benzene and drying the benzene solution over anhydrous potassium carbonate. Thereupon 20 grams of dry ethylchloroforminate were added and the mixture was kept at 40 degrees centigrade for one hour. The benzene-solution was thereupon extracted with water, dilute hydrochloric acid and sodium hydrogen carbonate solution, dried and evaporated. The residue was saponified with a mixture of 7 grams of potassium hydroxide, 7 milliliters of water and 50 milliliters of diethylene-glycol-mono-ethyl-ether under reflux for 20 hours. The reaction mixture was then diluted with water and the base extracted with ether. By addition of dilute hydrochloric acid to the ether phase the hydrochloride of 1-(3-methylaminopropyl)-1-phenyl-indane was obtained as colourless crystals which after drying and recrystallization from acetone melted at 177–180 degrees centigrade. Yield 5 grams.

EXAMPLE 3

3,3-dimethyl-1-(3'-dimethylaminopropyl)-1-phenylindane and its hydrochloride

The starting 3,3-dimethyl-1-phenyl-indane was obtained as follows:

46 grams of 4,4 - diphenyl-2-methyl-butanol-2 were added to 400 milliliters of concentrated sulphuric acid while stirring at room temperature. The reaction mixture was kept at about 30 degrees centigrade for 30 minutes whereupon it was poured onto finely crushed ice and extracted with ether. The ether phase was neutralized with sodium-hydrogencarbonate-solution, dried, treated with active carbon and filtered. The ether was evaporated and the residue crystallized from methanol yielding 3,3-dimethyl-1-phenyl-indane as colourless crystals melting at 41–45 degrees centigrade. Yield 31 grams.

11 grams of 3,3-dimethyl-1-phenyl-indane, 12 grams of 3-dimethylaminopropylchloride and 12 grams of sodiumhydride/material oil-suspension 50/50 were heated with 50 milliliters of dimethylsulfoxide to about 70 degrees centigrade when an exothermic reaction began. The further course of the reaction was as in Example 1 and the working-up of the reaction mixture was similar. There was obtained 11 grams of the hydrochloride of 3,3-dimethyl - 1-(3'-dimethylaminopropyl)-1 - phenyl-indane melting at 205–208 degrees centigrade.

EXAMPLE 4

3,3-dimethyl-1-(3'-methylaminopropyl)-1-phenyl-indane and its hydrochloride

When Example 2 was carried out using 11 grams of 3,3-dimethyl - 1-(3' - dimethylaminopropyl)-1-phenyl-indane instead of 1-(3' - dimethylaminopropyl)-1-phenyl-indane the hydrochloride of 3,3 - dimethyl-1-(3'-methylaminopropyl)-1-phenyl-indane was obtained as a crystalline substance melting at 150–155 degrees centigrade after recrystallization from acetone.

EXAMPLE 5

1-(3'-dimethylaminopropyl)-1-phenyl-tetraline and its hydrochloride 25 grams of 1-phenyl-tetraline were added to a mixture of potassium amide, prepared from 5 grams of potassium and 0.25 gram of ferrinitrate, and 325 milliliters of liquid ammonia, while stirring and the stirring continued for further 30 minutes, whereupon 18 grams of freshly distilled 3 - dimethylaminopropylchloride were added dropwise. The red colour of potassium-phenyltetraline disappeared gradually and the stirring was continued until ammonia had evaporated. Dilute hydrochloric acid was then added and the mixture extracted with ether. The aqueous phase was separated off and made alkaline whereupon the separated oil was taken over in ether. The ether phase was washed with water, dried over anhydrous potassium carbonate and evaporated. The residue was dissolved in acetone and the hydrochloride of 1-(3'-dimethylaminopropyl) - 1-phenyl-tetraline precipitated by addition of hydrogen chloride in acetone. After recrystallization from acetone it melted at 207–209 degrees centigrade. Yield 10 grams.

EXAMPLE 6

3-methyl-1-(3'-dimethylaminopropyl)-1-phenyl-indane and its isomers as well as hydrochlorides thereof 10 grams of 1-phenyl-3-methyl-indane, prepared in well-known manner by dimerization of styrene with strong sulphuric acid, were reacted as described in Example 1 with 3 grams of sodiumhydride and 7.5 grams of 3-dimethylaminopropylchloride in 40 milliliters of dimethylsulphoxide in an atmosphere of nitrogen. The exothermic reaction began first at about 80–90 degrees centigrade. The further isolation and working up of the reaction mixture was carried out as described in Example 1 except that the mixture of the isomeric hydrochlorides was precipitated from ethanol-ether (1:1) and recrystalized from methyl-iso-butylketone, whereby the hydrochloride of an isomer, for convenience named the α-form, was obtained as white crystals melting at 160–162 degrees centigrade.

EXAMPLE 7

3-methyl-1-(3'-methylaminopropyl)-1-phenyl-indane and its isomers as well as hydrochlorides thereof When Example 2 was carried out using the hydrochloride of 3-methyl - 1-(3'-dimethylaminopropyl)-1-phenyl-indane instead of 1-(3'-dimethylaminopropyl)-1-phenyl-indane a mixture of the hydrochlorides of 3-methyl-1-(3'-methylaminopropyl) - 1-phenyl-indane was obtained melting at about 150 degrees centigrade. Repeated recrystallizations from a mixture of acetone and ethanol (1:1) gave the two isomeric hydrochlorides with the following melting points:

α: M.P. 186–198 degrees centigrade
β: M.P. 165–166 degrees centigrade

EXAMPLE 8

3-methyl-1-(2'-dimethylaminoethyl)-1-phenyl-indane, its isomers and their hydrochlorides When Example 6 was carried out using 2-dimethylaminoethylchloride instead of 3-dimethylaminopropylchloride a mixture of the isomeric hydrochlorides of 3-methyl-1 - (2'-dimethylaminoethyl)-1-phenyl-indane was obtained. Repeated recrystallizations from acetone gave the two isomeric hydrochlorides with the following melting points:

α-form: M.P. 218–220 degrees centigrade
β-form: M.P. 206–207 degrees centigrade

EXAMPLE 9

3-methyl-1-(2'-methylaminoethyl)-1-phenyl-indane, its isomers and their hydrochlorides When Example 2 was carried out using the hydrochloride of 3 - methyl-1-(2'-dimethylaminoethyl)-1-phenyl-indane instead of 1-(3'-dimethylaminopropyl)-1-phenyl-indane a mixture of the isomeric hydrochlorides of 3-methyl-1-(2'-methylaminoethyl)-1-phenylindane was obtained. Repeated recrystallizations from acetone yielded the two isomeric hydrochlorides with the following characteristics:

α-form: M.P. 172–174 degrees centigrade (slightly soluble in acetone),
β-form: M.P. 126–128 degrees centigrade (easily soluble in acetone).

EXAMPLE 10

1-(3'-dimethylaminopropyl)-1-m-trifluoromethylphenyl)-indane

When Example 1 was carried out using 1-(m-trifluoromethyl-phenyl)-indane (B.P. 80–85 degrees centigrade/0.5 mm. Hg.) instead of 1-phenyl-indane 1-(3'-dimethylaminopropyl) - 1 - (m-trifluoromethylphenyl)-indane was obtained as a yellow oil which boiled at 125–130 degrees centigrade at a pressure of 0.5 mm. Hg. An elementary analysis gave the following result:

Calculated for (percent): C, 72.6; H, 6.92; N, 4.03.
Found (percent): C, 72.4; H, 7.21; N, 4.02.

EXAMPLE 11

Other 3.3-dimethyl-1-(3'-dimethylaminopropyl)-substituted indance and their hydrochlorides When Example 1 was carried out using equivalent amounts of 3.3-dimethyl-1-(p-chlorophenyl)-indane,
3.3-dimethyl-1-(m-chlorophenyl)-indane,
3.3-dimethyl-1-(p-fluorophenyl)-indane,
3.3-dimethyl-1-(p-tolyl)-indane,
3.3-dimethyl-1-(m-tolyl)-indane,
3.3-dimethyl-1-(p-methoxyphenyl)-indane,
3.3-dimethyl-1-(m-butoxyphenyl)-indane,
6-chloro-3.3-dimethyl-1-phenyl-indane,
6-trifluoro-methyl-3.3-dimethyl-1-phenyl-indane,
6-isopropyl-3.3-dimethyl-1-phenyl-indane,
5-fluoro-3.3-dimethyl-1-phenyl-indane respectively instead of 1-phenyl-indane the hydrochlorides of 3.3-dimethyl-1-(3'-dimethylaminopropyl)-1-(p-chlorophenyl)-indane,
3.3-dimethyl-1-(3'-dimethylaminopropyl)-1-(m-chlorophenyl)-indane,
3.3-dimethyl-1-(3'-dimethylaminopropyl)-1-(p-fluorophenyl)-indane,
3.3-dimethyl-1-(3'-dimethylaminopropyl)-1-(p-tolyl)-indane, 3.3-dimethyl-1-(3'-dimethylaminopropyl)-1-(m-tolyl)-
  indane,
3.3-dimethyl-1-(3'-dimethylaminopropyl)-1-(p-methoxyphenyl)-indane,
3.3-dimethyl-1-(3'-dimethylaminopropyl)-1-(m-butoxyphenyl)-indane,
6-chloro-3.3-dimethyl-1-(3'-dimethylaminopropyl)-1-phenyl-indane,
6-trifluoromethyl-3.3-dimethyl-1-(3'-dimethylaminopropyl)-1-phenyl-indane,
6-iso-propyl-3,3-dimethyl-1-(3'-dimethylaminopropyl)-1-phenyl-indane and
5-fluoro-3.3-dimethyl-1-(3'-dimethylaminopropyl)-1-phenyl-indane respectively were obtained.

EXAMPLE 12

Other 3.3-dimethyl-1-(3'-methylaminopropyl)-substituted indanes and their hydrochlorides When Example 2 was carried out using equivalent amounts of the hydrochlorides of 3.3-dimethyl-1-(3'-dimethylaminopropyl)-1-(p-chlorophenyl)-indane,
3.3-dimethyl-1-(3'-dimethylaminopropyl)-1-(m-chlorophenyl)-indane,
3.3-dimethyl-1-(3'-dimethylaminopropyl)-1-(p-fluorophenyl)-indane,
3.3-dimethyl-1-(3'-dimethylaminopropyl)-1-(p-tolyl)-indane,
3.3-dimethyl-1-(3'-dimethylaminopropyl)-1-(m-tolyl)-indane,
3.3-dimethyl-1-(3'-dimethylaminopropyl)-1-(p-methoxyphenyl)-indane,
3.3-dimethyl-1-(3'-dimethylaminopropyl)-1-(m-butoxyphenyl)-indane,
6-chloro-3.3-dimethyl-1-(3'-dimethylaminopropyl)-1-phenyl-indane,
6-trifluoromethyl-3.3-dimethyl-1-(3'-dimethylaminopropyl)-1-phenyl-indane,
6-iso-propyl-3.3-dimethyl-1-(3'-dimethylaminopropyl)-1-phenyl-indane and
5-fluoro-3.3-dimethyl-1-(3'-dimethylaminopropyl)-1-phenyl-indane respectively instead of the hydrochloride of 1-(3'-dimethylaminopropyl)-1-phenyl-indane the hydrochlorides of 3.3-dimethyl-1-(3'-methylaminopropyl)-1-(p-chlorophenyl)-indane,
3.3-dimethyl-1-(3'-methylaminopropyl)-1-(m-chlorophenyl)-indane,
3.3-dimethyl-1-(3'-methylaminopropyl)-1-(p-fluorophenyl)-indane,
3.3-dimethyl-1-(3'-methylaminopropyl)-1-(p-tolyl-phenyl)-indane,
3.3-dimethyl-1-(3'-methylaminopropyl)-1-(m-tolyl-phenyl)-indane,
3.3-dimethyl-1-(3'-methylaminopropyl)-1-(p-methoxyphenyl)-indane,
3.3-dimethyl-1-(3'-methylaminopropyl)-1-(m-butoxyphenyl)-indane,
6-chloro-3.3-dimethyl-1-(3'-methylaminopropyl)-1-phenyl-indane,
6-trifluoromethyl-3.3-dimethyl-1-(3'-methylaminopropyl)-1-phenyl-indane,
6-iso-propyl-3.3-dimethyl-1-(3'-methylaminopropyl)-1-phenyl-indane and
5-fluoro-3.3-dimethyl-1-(3'-methylaminopropyl)-1-phenylindane respectively were obtained.

EXAMPLE 13

Other 3.3-dimethyl-1-phenyl-substituted indanes and their hydrochlorides

When Example 3 was carried out using equivalent amounts of 3-diethylaminopropylchloride,
3-di-n-butylaminopropylchloride,
3-N-piperidinopropylchloride,
3-(N'-methyl-N-piperazino)-propylchloride,
3-(4-morpholinyl)-propylchloride and
3-N-pyrrolidylchloride respectively instead of 3-dimethylaminopropylchloride the hydrochlorides of
3.3-dimethyl-1-(3'-diethylaminopropyl)-1-phenylindane,
3.3-dimethyl-1-(3'-di-n-butylaminopropyl)-1-phenyl-indane,
3.3-dimethyl-1-(3'-N-piperidinopropyl)-1-phenylindane,
3.3-dimethyl-1-[3'-(N'-methyl-N-piperazino)propyl]-1-phenylindane,
3.3-dimethyl-1-[3'-(4-morpholinyl)propyl]-1-phenyl-indane and
3.3-dimethyl-1-(3'-N-pyrrolidylpropyl)-1-phenylindane respectively were obtained.

EXAMPLE 14

3.3-dimethyl-1-(2'-dimethylaminoethyl)-1-phenyl-indane and its hydrochloride

When Example 3 was carried out using 10 grams of 2-dimethylaminopropylchloride instead of 3-dimethylaminopropylchloride the hydrochloride of 3.3-dimethyl-1-(2 - dimethylaminoethyl) - 1 - phenyl-indane was obtained as a crystalline substance melting at 161–163 degrees centigrade.

EXAMPLE 15

3.3-dimethyl-1-(3'-dimethylaminopropyl)-1-cyano-indane and its hydrochloride

The starting 3.3-dimethyl-1-cyano-indane was obtained as follows:

To one mole of sodiumbenzylcyanide, prepared from one mole of benzylcyanide (117 grams) and one mole (39 grams) of sodium amide in liquid ammonia in 2 liters of anhydrous ether was added dropwise at zero degrees centigrade and while stirring one mole (90.5 grams) of methallylchloride, whereupon the reaction mixture was stirred at room temperature for two hours. The reaction mixture was then washed with dilute hydrochloric acid and water and fractionally distilled in vacuo after drying. 66 grams of α-methallylbenzylcyanide were obtained boiling at 90–100 degrees centigrade/0.2 mm. Hg.

66 grams of α-methallylbenzylcyanide were added dropwise to a mixture of 70 milliliters of n-heptane and 90 grams finely crushed anhydrous aluminum chloride at 40–50 degrees centigrade while stirring. The stirring was continued at 55–60 degrees centigrade for further 30 minutes and the reaction mixture was then poured unto finely crushed ice, extracted with ether, the ether phase washed with dilute sodium carbonate solution, dried over anhydrous magnesium sulphate and distilled. The fraction boiling at 85–90 degrees centigrade/0.2 mm. Hg was collected and constitutes 3.3-dimethyl-1-cyano-idane. Yield 50 grams.

To a mixture of 14 grams of 3.3-dimethyl-1-cyano-indane and 10 grams of a sodiumhydride/mineral oil-suspension in 100 milliliters of dimethyl-sulphoxide were added while stirring 14 grams of 3-dimethylaminopropyl-chloride and keeping the reaction temperature at 60–70 degrees centigrade by cooling. After the reaction has been completed the excess sodium hydride was destroyed with ethanol and the reaction mixture poured into 1 liter of water and finally extracted with ether. The ether phase was then extracted with dilute hydrochloric acid, the aqueous phase separated and made alkaline with dilute sodium hydroxide solution and the base which separates extracted with ether, the ether phase dried over anhydrous potassium carbonate, filtered and evaporated. 17 grams of 3.3-dimethyl-1-(3'-dimethyl-amino-propyl)-1-cyano-indane were obtained as a yellow oil.

The hydrochloride was obtained as a white crystalline substance from acetone and melts at 196–198 degrees centigrade.

EXAMPLE 16

3.3-dimethyl-1-(2'-dimethylaminoethyl)-1-cyano-indane and its hydrochloride

When Example 15 was carried out using 12.5 grams of 2-dimethylaminoethylchloride instead of 3-dimethylaminopropylchloride the hydrochloride of 3.3-dimethyl-1-(2' - dimethylaminoethyl)-1-cyano-indane was isolated as a white crystalline substance melting at 228–230 degrees centigrade. Yield 15 grams.

EXAMPLE 17

3.3-dimethyl-1-(3'-methylaminopropyl)-1-cyano-indane and its hydrochloride

When Example 15 was carried out using 15 grams of 3-methylaminopropylchloride instead of 3 - dimethylaminopropylchloride the hydrochloride of 3.3-dimethyl-1-(3'-methylaminopropyl)-1-cyano-indane was isolated as white crystals melting at 140–142 degrees centigrade. Yield 16 grams.

EXAMPLE 18

3.3-dimethyl-1-(3'-dimethylaminopropyl)-1-acetyl-indane and its hydrochloride

To a solution of methylmagnesium iodide prepared from 20 grams of methyliodide in 50 milliliters of dry ether were added 20 grams of 3.3-dimethyl-1-(3'-dimethylaminopropyl) - 1 - cyano-indane. Thereupon 100 milliliters of dry toluene were added, the ether evaporated whereupon the reaction mixture was refluxed for 5 hours and then poured unto finely crushed ice, dilute hydrochloric acid added to pH 1, whereupon the aqueous phase was washed with ether. The acid solution was then heated for 15 minutes on a steam bath, cooled and made alkaline with dilute sodium hydroxide solution. The base which separated out was extracted with ether, the ether phase dried over anhydrous potassium carbonate, filtered and evaporated. The residue was dissolved in 50 milliliters of acetone and neutralized to pH 5 with dry hydrogen chloride and 12 grams of the hydrochloride of 3.3 - dimethyl - 1 - (3'-dimethylaminopropyl)-1-acetylindane crystallized out melting at 204–206 degrees centigrade.

EXAMPLE 19

3.3-dimethyl-1-(3'-dimethylaminopropyl)-1-carboxy-indane and its hydrochloride 12 grams of 3.3-dimethyl-1-(3'-dimethylaminopropyl)-1-cyano-indane were heated on a steam bath for 4½ days under reflux with a solution of 10 grams of potassium hydroxide in 50 milliliters of ethanol. The mixture was then cooled, neutralized to pH 5 with dry hydrogenchloride and filtered. The filtrate was evaporated to dryness, the residue dissoved in 40 milliliters of hot acetone and filtered. Upon cooling and standing 7 grams of the hydrochloride of 3.3-dimethyl-1-(3'-dimthylaminopropyl)-1-carboxy-indane crystallized out. After recrystallization from acetone it melts at 145–148 degrees centigrade.

EXAMPLE 20

3.3-dimethyl-1-(3'dimethylaminopropyl)-indane-carboxamide-1 and its hydrochloride 25 grams of 3.3-dimethyl - 1 - (3' - dimethylaminopropyl)-1-cyano-indane were boiled for 2 hours in ethanol saturated with hydrogen chloride. Then the ethanol was evaporated and the residue dissolved in water. The aqueous solution was made alkaline with sodium hydroxide and extracted with ether. The ether phase was dried over anhydrous potassium carbonate and the ether evaporated. The 3.3-dimethyl-1-(3'-dimethylaminopropyl)-indane-carboxamide-1 was thereby obtained as a yellow oil. The hydrochloride was obtained by dissolving the base in ethanol and making the solution slightly acid with dry hydrogen chloride.

EXAMPLE 21

3.3-dimethyl-1-(3'-dimethylaminopropyl)-1-carbethoxy-indane and its hydrochloride 13 grams of 3.3-dimethyl-1-(3'-dimethylaminopropyl)-1-carboxy-indane were dissolved in ethanol and the solution saturated with hydrogen chloride and refluxed for 30 minutes. The reaction mixture was poured into ice water, sodium hydroxide solution added to alkaline reaction and the oil which separated out taken over in ether. The ether solution was dried over sodium sulphate, filtered and evaporated on a steam bath. The residue was dissolved in boiling acetone made slightly acid with hydrogen chloride. Upon cooling and addition of ether the hydrochloride of 3.3-dimethyl - 1 - (3'-dimethylaminopropyl)-1-carbethoxy-indane was obtained as a white crystalline substance.

The compounds of Formula I and the non-toxic acid addition salts thereof may be administered to animals including human beings both orally and parenterally, and may be used for example in the form of tablets, capsules, powders, syrups or in the form of the usual sterile solutions for injection. Results upon administration to human beings have been very gratifying.

Most conveniently the compounds of Formula I are administered orally in unit dosage form such as tablets or capsules, each dosage unit containing a non-toxic acid addition salt of one of the said compounds in an amount of from about 0.1 to about 100 mg., most preferably, however, from about 0.5–25 mg., calculated as the free amine, the total daily dosage usually ranging from about 0.5 to about 300 mg. The exact individual dosages as well as daily dosages in a particular case will, of course, be determined according to established medical principles under the direction of a physician.

When preparing tablets, the active ingredient is for the most part mixed with ordinary tablet adjuvants such as corn starch, potato starch, talcum, magnesium stearate, gelatine, lactose, gums, or the like. A suitable formula for a tablet containing 10 mg. of 3.3-dimethyl-1-(3'-methylaminopropyl)-1phenyl-indane (called Lu 3–049 for short) in the form of its hydrochloride is as follows:

| | Mg. |
|---|---|
| Lu 3–049, hydrochloride | 11.2 |
| Potato starch | 36 |
| Lactose | 18 |
| Gelatine | 5 |
| Talcum | 6 |
| Magnesium stearate | 0.4 |

Another suitable formulation for a tablet containing 10 milligrams of Lu 3–049 is as follows:

| | Mg. |
|---|---|
| Lu 3–049, hydrochloride | 11.2 |
| Potato starch | 40 |
| Polyvinylpyrrolidone | 5 |

Sugar coated and colored.

A suitable formulation for a capsule containing 10 milligrams of Lu 3–049 is as follows:

| | Mg. |
|---|---|
| Lu 3–049, hydrochloride | 11.2 |
| Corn starch | 90 |
| Lactose | 50 |
| Talcum | 2 |

Filled in a gelatine capsule.

A suitable formulation for an injectable solution containing one percent of Lu 3–049 in the form of its hydrochloride is as follows:

Lu 3–049, hydrochloride—11.2 mg.
Sorbitol—40 mg.
Sterile water to make—1 ml.

Any other pharmaceutical tableting adjuvants may be used provided that they are compatible with the active ingredient, and additional compositions and dosage forms may be similar to those presently used for thymoleptics such as imipramine, amitriptyline or nortriptyline. Also combination of the compounds of Formula I as well as their non-toxic acid salts with other active ingredients especially other thymoleptics, neuroleptics, tranquilizers, or the like fall within the scope of the present invention.

As previously stated, when isolating the compounds of Formula I in the form of an acid addition salt, the acid is preferably selected so as to contain an anion which is non-toxic and pharmacologically acceptable, at least in usual therapeutic doses. Representative salts which are included in this preferred group are the hydrochlorides, hydrobromides, sulphates, acetates, phosphates, nitrates, methanesulphonates, ethanesulphonates, lactates, citrates, tartrates or bitartrates, and maleates of the amines of Formula I. Other acids are likewise suitable and may be employed if desired. For example, fumaric, benzoic, ascorbic, succinic, salicylic, bismethylenesalicylic, propionic, gluconic, malic, malonic, mandelic, cinnamic, citraconic, stearic, palmitic, itaconic, glycolic, benzenesulphonic, and sulphamic acids may also be employed as acid addition saltforming acids. When it is desired to isolate a compound of the invention in the form of the free base, this may be done according to conventional procedure, as by dissolving the isolated or unisolated salt in water, treating with a suitable alkaline material, extracting the liberated free base with a suitable organic solvent drying the extract and evaporating to dryness or fractionally distilling to effect isolation of the free basic amine.

It is to be understood that the invention is not limited to the exact details of operation or exact compound or compositions shown and described, as obvious modifications and equivalents will be apparent to one skilled in the art.

We claim:

1. A compound selected from the group consisting of (a) compounds of the general formula:

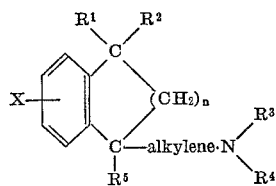

wherein $R^1$ and $R^2$ each is a lower alkyl-group, $n$ is selected from 1 and 2, "alkylene" is an alkylene chain containing from two to eight carbon atoms, at least two and at the highest four carbon atoms being in the chain directly connecting the ring system with the nitrogen atom,

is selected from the class consisting of mono-lower-alkylamino and di-lower-alkylamino, $R^5$ is selected from the group consisting of phenyl, and phenyl substituted with a substituent selected from the group consisting of chlorine, fluorine, lower-alkyl, lower-alkyloxy and trifluoromethyl and X is selected from the group consisting of hydrogen, chlorine, fluorine, lower-alkyl, lower-alkyloxy and trifluoromethyl, and (b) nontoxic acid addition salts thereof with pharmaceuticaly acceptable acids.

2. A compound according to claim 1 of the following formula:

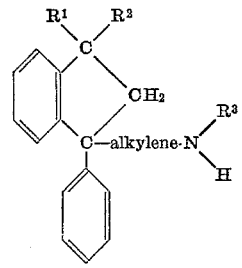

wherein $R^1$, $R^2$ and $R^3$ each is lower-alkyl and "alkylene" is an alkylene chain containing from two to eight carbon atoms, at least two and at the highest four carbon atoms being in the chain directly connecting the ring system with the nitrogen atom.

3. A nontoxic acid addition salt of a compound according to claim 1 of the formula:

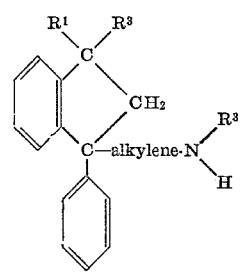

wherein $R^1$, $R^2$ and $R^3$ each is lower-alkyl and "alkylene" is an alkylene chain containing from two to eight carbon atoms, at least two and at the highest four carbon atoms being in the chain directly connecting the ring system with the nitrogen atom.

4. A compound according to claim 1 of the formula:

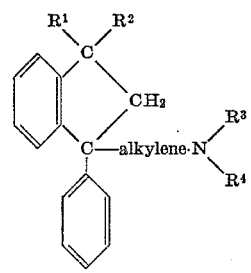

wherein $R^1$, $R^2$, $R^3$ and $R^4$ each is lower-alkyl and "alkylene" is an alkylene chain containing from two to eight carbon atoms, at least two and at the highest four carbon atoms being in the chain directly connecting the ring system with the nitrogen atom.

5. A nontoxic acid addition salt of a compound according to claim 1 of the formula:

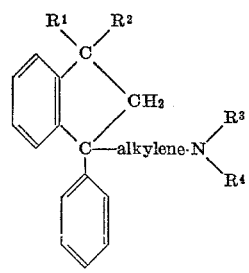

wherein $R^1$, $R^2$, $R^3$ and $R^4$ each is lower-alkyl and "alkylene" is an alkylene chain containing from two to eight carbon atoms, at least two and at the highest four carbon atoms being in the chain directly connecting the ring system with the nitrogen atom.

6. A compound according to claim 1 which is 3.3-dimethyl-1-(3'-methylaminopropyl)-1-phenyl-indane.

7. A compound according to claim 1 which is a nontoxic acid addition salt of 3.3-dimethyl-1-(3'-methylaminopropyl)-1-phenyl-indane.

8. A compound according to claim 1 which is the hydrochloride of 3.3-dimethyl-1-(3'-methylaminopropyl)-1-phenyl-indane.

9. A compound according to claim 1 which is 3.3-dimethyl-1-(3'-dimethylaminopropyl)-1-phenyl-indane.

10. A compound according to claim 1 which is a nontoxic addition salt of 3.3-dimethyl-1-(3'-dimethylaminopropyl)-1-phenyl-indane.

11. A compound according to claim 1 which is the hydrochloride of 3.3-dimethyl-1-(3'-dimethylaminopropyl)-1-phenyl-indane.

References Cited

UNITED STATES PATENTS

| | | | |
|---|---|---|---|
| 2,798,888 | 7/1957 | Veberwasser | 260—570.8 |
| 3,408,389 | 10/1968 | Bernstein et al. | 260—570.8 X |

FOREIGN PATENTS

| | | |
|---|---|---|
| 959,704 | 6/1964 | Great Britain. |

OTHER REFERENCES

Jabor et al., Chemical Abstracts, vol. 59, p. 9931, 1963.

CHARLES B. PARKER, Primary Examiner

D. H. TORRENCE, Assistant Examiner

U.S. Cl. X.R.

260—243, 247, 247.2, 247.7, 268, 293, 294, 294.3, 294.7, 326.87, 465, 471, 501.1, 501.17, 501.21, 518, 519, 558, 559; 424—246, 248, 267, 274, 250, 304, 309, 317, 324, 330

UNITED STATES PATENT OFFICE
CERTIFICATE OF CORRECTION

Patent No. 3,505,404     Dated April 7, 1970

Inventor(s)  Petersen, et al.

It is certified that error appears in the above-identified patent and that said Letters Patent are hereby corrected as shown below:

Column 1, line 70
Appl. Page 1, line 19

"CHOR·$R^7$" should read
--- CHOH·$R^7$ ---

Column 5, line 34
Appl. Page 9, line 2

"until ammonia" should read
--- until all ammonia ---

Column 6, line 37
Appl. Page 11, line 11

"-1-m-" should read
--- -1-(m- ---

Column 9, Example 19 line 59
Appl. Page 16, line 11

"3'-dimthyl" should read
--- 3'-dimethyl ---

Column 12, Claim 3, line 24
Appl. Page 24, Old Claim 17

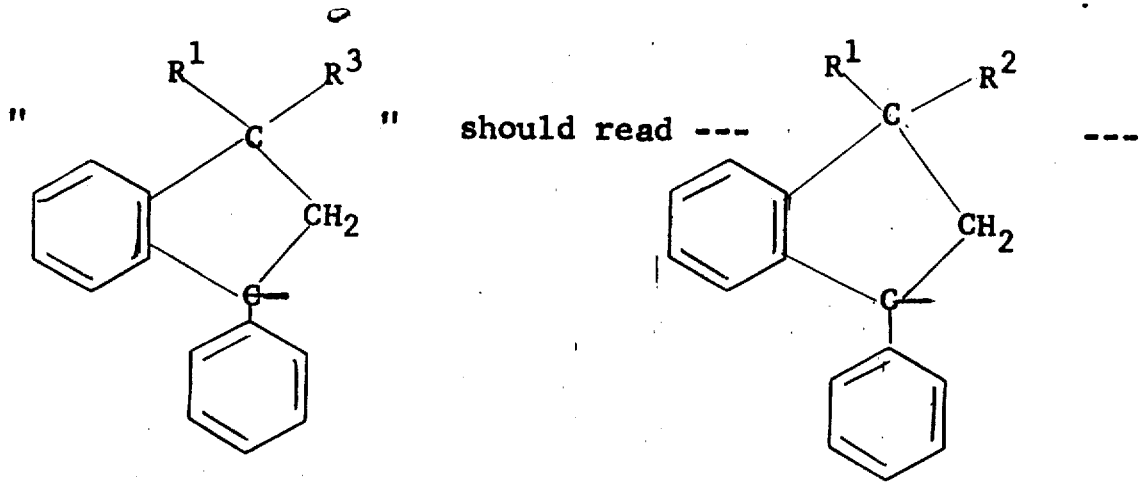

Signed and sealed this 1st day of December 1970.

(SEAL)
Attest:

Edward M. Fletcher, Jr.
Attesting Officer

WILLIAM E. SCHUYLER, JR.
Commissioner of Patents